FIG.4

Inventor
ADOLPH LOVOFF

Sept. 5, 1961  A. LOVOFF  2,999,161
METHOD OF AND MEANS FOR HORIZON STABILIZATION
Filed Oct. 10, 1945  6 Sheets-Sheet 4

FIG.8 — OSCILLATION ABOUT HORIZON

FIG.9 — OSCILLATION ABOVE HORIZON

FIG.10 — OSCILLATION BELOW HORIZON

Inventor
ADOLPH LOVOFF

By
Attorney

FIG. 11

United States Patent Office 2,999,161
Patented Sept. 5, 1961

2,999,161
METHOD OF AND MEANS FOR HORIZON STABILIZATION
Adolph Lovoff, Detroit, Mich.
(3517 A St. SE., Washington, D.C.)
Filed Oct. 10, 1945, Ser. No. 621,631
20 Claims. (Cl. 250—83.3)
(Granted under Title 35, U.S. Code (1952), sec. 266)

My invention relates to the application of heat detector devices to locate the horizon and to the use of heat detector devices to stabilize apparatus with respect to the horizon.

Many types of instruments and other devices used on moving vehicles such as ships require that the orientation of the device with respect to the horizon be known. A large proportion of such devices require that the mounting be constantly adjusted to maintain the device at a fixed orientation with respect to the horizon. Such correction may be required only along one horizontal axis or line of azimuth as, for example, in the case of a sighting device. Other applications may require stabilization along two intersecting axes to produce a stable vertical reference or platform maintained horizontal in spite of motion of the vessel or vehicle upon which the apparatus is being carried. To produce such a reference, it has been common practice to use a gyroscope as a stable vertical. However, in order to obtain accuracy of a high order, such gyroscopes are necessarily expensive and mechanically complicated and suffer from the disadvantages of excessive weight and space requirements. Because of the large inertia of the rotating element, such gyroscopes require considerable time in coming up to speed. A further disadvantage of the use of gyroscopes on shipboard arises from the fact that they must be mounted near the metacenter of the vessel.

Where the vehicle, for example a surface or aircraft, is subject to rapid acceleration, such acceleration may reduce the accuracy of a gyroscope or make its use entirely impracticable.

In order to overcome the above disadvantages of presently used stabilizers, I propose to provide stabilization by utilizing thermal effects existing at the horizon. It is known that all objects radiate more or less energy in the infra-red region. The radiant intensity of such radiation in the direction of the observer can be detected by sensitive detection devices and is commonly used as a means for detecting the presence of radiating bodies under adverse visual conditions. It has also been known that the atmosphere itself radiates heat at a low intensity in the direction of the observer. The difference between the radiant intensity of the radiation received from the atmosphere and that received from surrounding natural objects located on the horizon has been considered too small for practical application. However, studies have shown that a relatively great thermal discontinuity is present at the horizon. It has been found that the radiant intensity in the direction of the observer changes considerably as a heat detector is swept vertically from a fraction of a degree above to a fraction of a degree below the horizon, while beyond these limits a considerably less change in radiant intensity is noted per degree of vertical sweep. Stated another way, the thermal gradient at the horizon is relatively great. Because of the sharply defined nature of this phenomenon, it may serve as a basis for a highly accurate method of stabilization. Since infra-red radiation can penetrate light fog and smoke, and since such radiation is present under conditions of darkness, this method of stabilization is practicable when visual methods would be out of the question. While it is true that under conditions of rainfall or very dense fog the intensity of radiation received from the horizon is low to the point that the use of a device may be limited, such conditions would also limit the use of heat detection devices utilizing the stabilization offered by my invention.

In general my invention relates to improved means for locating the horizon and in utilizing the received horizon indication as a means for obtaining stabilization.

More particularly, my invention utilizes the thermal discontinuity or thermal gradient existing at the horizon for purposes of detection and stabilization. A feature of my invention resides in the fact that the equipment required to obtain accurate stabilization may be lighter in weight, smaller in size, and less complex and expensive than other means which have been used to obtain accurate stabilization. The apparatus which I describe can be mounted integral with the stabilized equipment, thereby correcting for deflections in the structure of the vessel which cause the gyroscopic type of stabilizer to lose accuracy.

In addition, the method of construction which I disclose, produces a structure better adapted to portability and to use on smaller vessels than devices heretofore used. A further advantage inherent in my invention is the shorter length of time required to put the device into operation due to the elimination of high inertia mechanical components. Still another characteristic of my invention is the frictionless nature of the "pick off" and the absence of contacts required to continually make or break electrical circuits carrying large amounts of power.

My invention also resides in features of construction, combination and arrangement herein described or disclosed.

Figure 1:
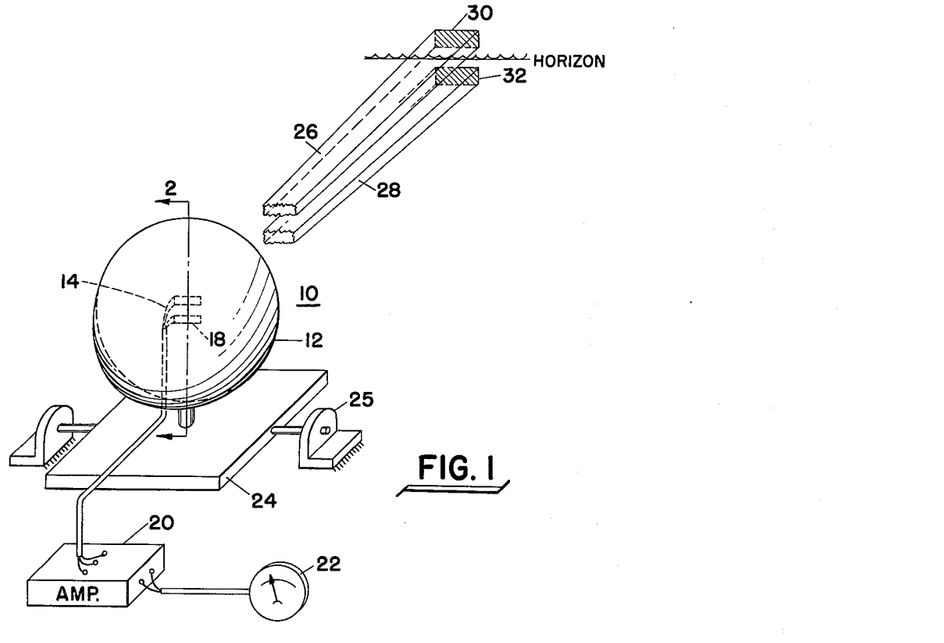
FIGURE 1 is an isometric view of a simplified embodiment of my invention showing a heat detector horizontally pivoted to serve as a horizon locator.

FIGURE 1 shows a heat detector indicated generally by the numeral 10 which includes a reflector 12 and a heat-sensitive cell 14 consisting of an upper element 16 and a lower element 18. The mirror 12 is preferably of the parabolic type although other types of collectors, for example, a spherical mirror and a Schmidt lens combination may be used. The output of the heat-sensitive cell 14 is fed into an amplifier 20 so constructed that the difference of the intensity of the radiation striking element 16 as compared with that striking element 18 is indicated on an indicating device 22. Such difference may be termed the differential output of the cell or amplifier. The heat detector is pivoted about a horizontal axis 25 on the table or mount 24.

In FIGURE 1, the paths traversed by the radiation emanating from a distance which is received by the heat-sensitive elements respectively are indicated by the columns 26 and 28. With the detector 10 oriented in the position shown, one element is receiving heat from an area 32 just below the horizon while the other element is receiving heat from an area 30 just above the horizon. The path of the incoming radiation is shown in greater detail in FIGURE 2. If a parabolic mirror or equivalent is used, the radiation emanating from the area 30 will be focused at the heat-sensitive element 18 located slightly below the focal point while the radiation traversing path 28 will be focused at the heat-sensitive element 16 located slightly above the focal point. The function of the parabolic mirror or reflecting device 12 may be more clearly understood by considering the mirror as a projector instead of a collector. If heat-sensitive elements 16 and 18 were made incandescent, their enlarged images 32 and 30 respectively would be projected on a screen placed at a remote location. Since considering the radiation in the reverse sense does not affect its path, it will be obvious that the radiation emanating from an area 30 will be collected by heat-sensitive element 18 while that being radiated from an area 32 will be collected by the heat-sensitive element 16.

Figure 2:
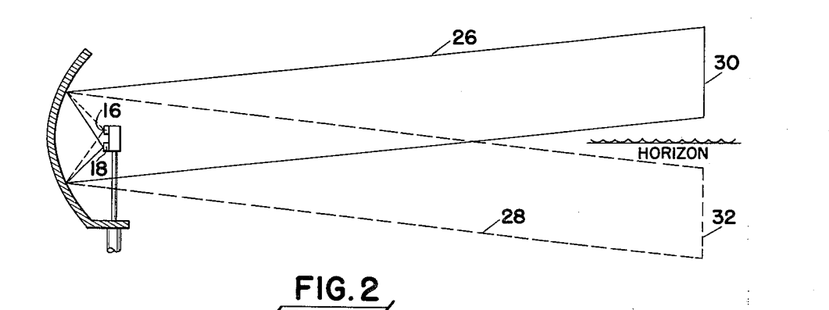
FIGURE 2 is a sectional view taken on section 2—2 of FIGURE 1, showing the path of incoming radiation with respect to the heat-sensitive device.

In order that this focusing may be as sharp as possible, it will be obvious that the mirror 12 should be accurately formed and that heat-sensitive elements 16 and 18 should be accurately located and small in size. Using a mirror having a diameter of 7 inches, the heat-sensitive elements may, for example, be 3 millimeters in horizontal extent, .1 millimeter in vertical extent and spaced apart by a distance of .1 millimeter. An increased horizontal dimension may be employed to increase the amount of received radiant flux if desired.

While the divergence of the radiation paths 26 and 28 has been shown in FIGURE 2 to be relatively great, by choice of a proper mirror this divergence can be made very small so that the radiation paths 26 and 28 may be considered as one narrow beam. Because the radiation striking the temperature sensitive cell may thus be combined into substantially one beam, this type of detector may be called a "beam" type detector to distinguish it from detectors having heat-sensitive elements subject to miscellaneous scattered radiation. A number of different types of small size heat-sensitive elements could be used; however, I prefer to use a thermistor, or thermopile, or a cell of the lead sulfide type. Regardless of the type of heat-sensitive elements used, the elements may be connected in the opposite sense so that the net output signal of the heat detector is a function of the difference between the amount of radiant flux striking the two elements. Alternatively, the elements may be connected in the same sense and the amplifier 20 so constructed as to produce an output signal which is a function of the difference in radiant flux striking the heat-sensitive elements. The amplifier 20 may be of the D.C. type; however as will be seen in the discussion which follows, means may be provided for cyclicly varying the signal produced by the heat-sensitive elements in order that the more satisfactory A.C. type of amplifier may be used.

Figures 3, 5, 6, 7:
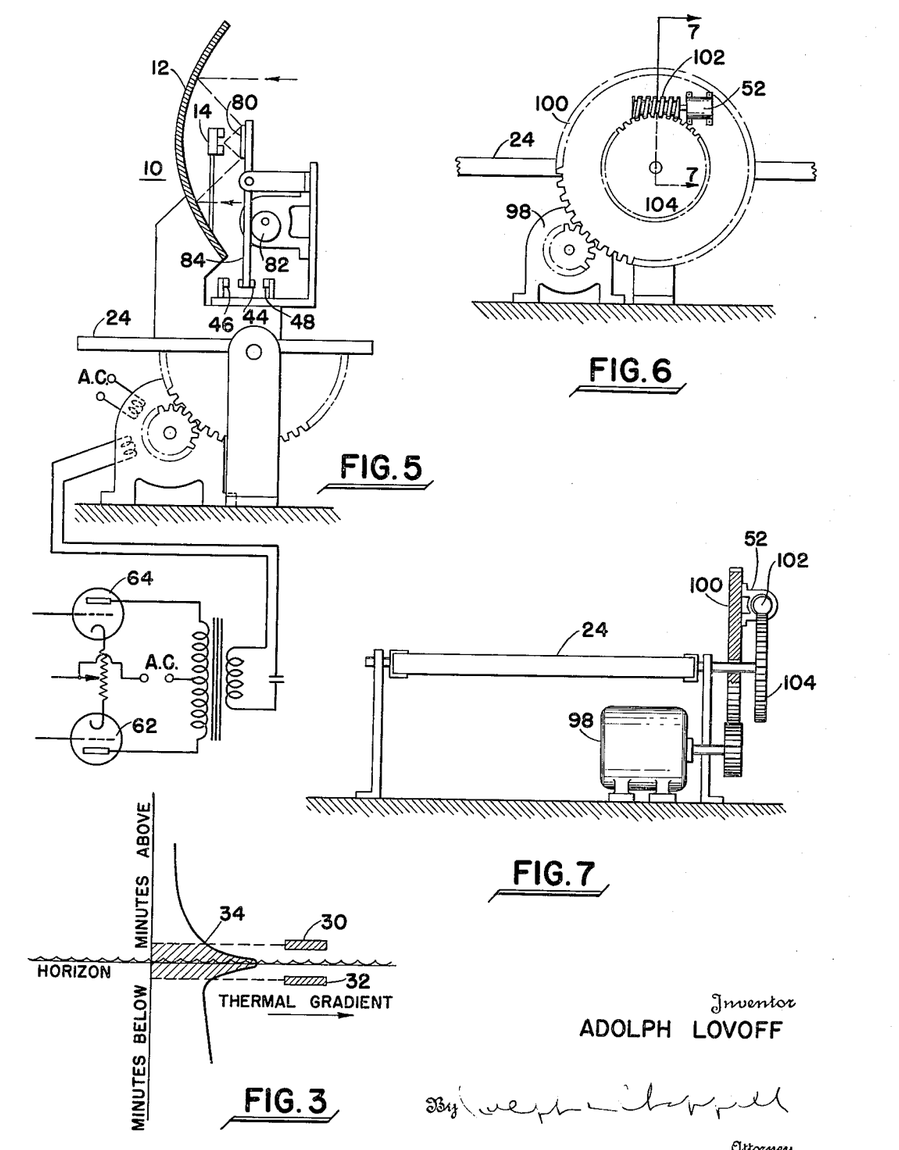
FIGURE 3 is a plot of thermal gradient as a function of the elevation which has found to exist in the region of the horizon.
FIGURE 5 illustrates a method of obtaining a periodic output signal by oscillating a small auxiliary mirror placed in the path of the incoming radiation.
FIGURE 6 shows a means for obtaining coarse stabilization by means of a gyroscope and vernier stabilization by means of a heat detector apparatus.
FIGURE 7 is a sectional view taken on section 7—7 of FIGURE 6.

FIGURE 3 shows a graphical representation of the variation of thermal gradient which has been found experimentally for the region immediately surrounding the horizon. The data from which this curve was drawn was obtained by means of a beam type heat detector of the type just described. It shows that as a beam type heat detector is swung downwardly toward the horizon, the radiation intensity in the direction of the observer increases sharply. Stated another way, the difference in radiant intensity in the direction of the observer emanating from two vertically-adjacent areas is a maximum in the vicinity of the horizon. That this phenomenon may be advantageously utilized is brought out by considering the field areas 30 and 32 in connection with the gradient curve. Since the thermal gradient is the rate of change of radiant intensity with respect to elevation in the direction of the observer, the area included under the gradient curve between any two ordinates is proportional to the difference in radiant intensity between the ordinates considered. It will be noted from FIGURE 3 that the area 34 cut off by the ordinates of areas 30 and 32 is a maximum in the near vicinity of the horizon. In other words, the difference in signal output between the heat-sensitive elements 16 and 18 is a maximum in the vicinity of the horizon.

The device of FIGURE 1 may be utilized to locate the elevation corresponding to the horizon by manually tilting table 24 until a maximum reading is obtained on the indicating device 22.

Figure 4:
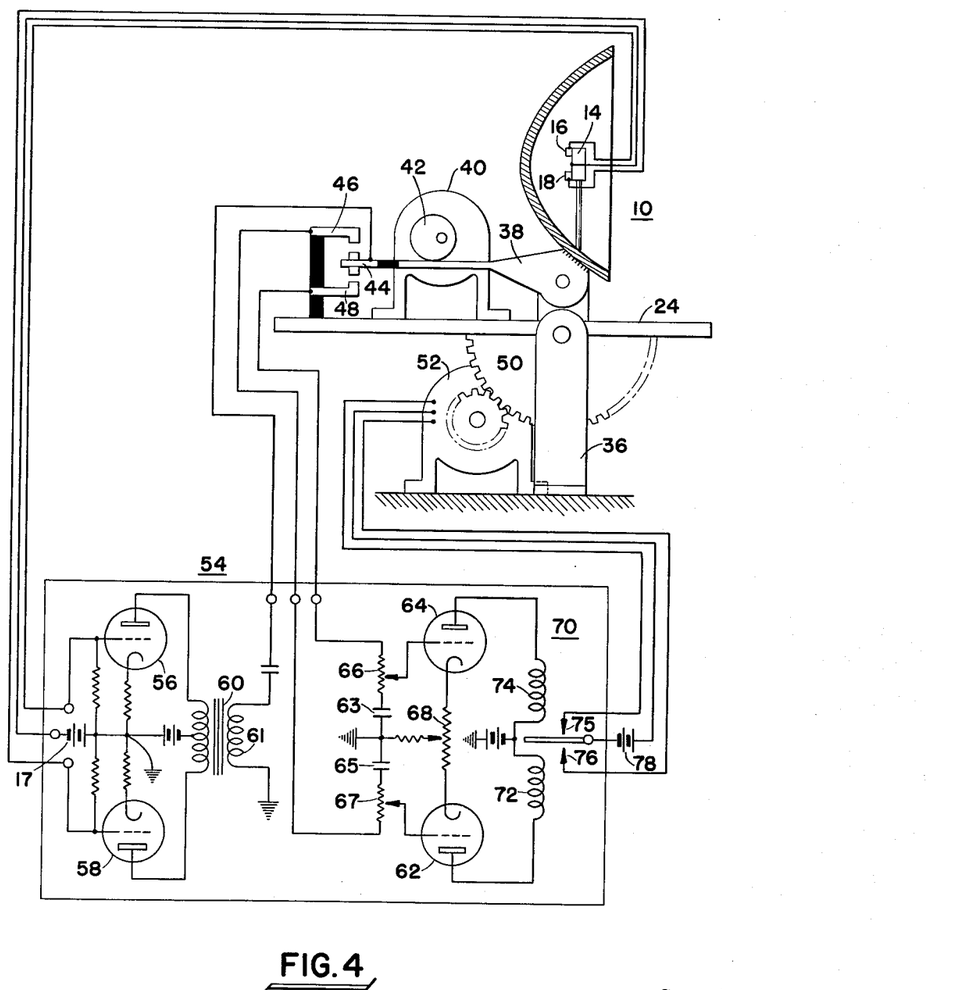
FIGURE 4 shows an arrangement in which the heat detector is used to obtain automatic stabilization of a table with respect to the horizon.

An automatic horizon stabilizer is shown in FIGURE 4. The heat detector 10 is pivotally mounted on a table 24. The table 24 is in turn horizontally pivoted with respect to the carrying craft on brackets 36. Rigidly connected to the heat detector 10 is an arm 38 which is oscillated about a horizontal axis, for example, by means of a motor 40 driving a cam 42. The eccentricity of the cam 42 is such that the amplitude of oscillation of the detector 10 is approximately one half degree on each side of the neutral point. A contact 44 carried by the arm 38 oscillates between two fixed contacts 46 and 48 insulatedly mounted on the table 24. Coupled to the table is a circular rack 50 reversibly driven by a servo motor 52. The output signal from the heat sensitive elements 16 and 18 is fed into an amplifier 54. Included in the amplifier 54 are a source of bias voltage 17 and a plurality of amplifier tubes which for purposes of diagrammatic simplicity may be indicated by the tubes 56 and 58. The difference in the signal output of tubes 56 and 58, which is a function of the difference in the radiant flux striking elements 16 and 18, may be obtained by means of the circuit shown including a transformer 60.

If desired, elements 16 and 18 may be respectively biased by separate sources of bias voltage such that the signals produced by a given amount of radiant flux are equal and opposite. Any net difference in signal caused by unequal amounts of flux striking the elements may be fed into a single channel A.C. amplifier rather than the two channel amplifier illustrated.

The output of the transformer 60 is connected to the oscillating contact 44 while the cooperating fixed contacts 46 and 48 respectively supply the input signals to the tubes 62 and 64. In the grid circuits of tubes 62 and 64, potentiometers 66 and 67 are provided to adjust the gain. Capacitors 63 and 65 are included in the grid circuit to increase the time constant to a value determined by experiment which will insure that the servo motor has time to respond to corrective pulses. Another potentiometer 68 is associated with the cathodes of the tubes to adjust the relative grid bias.

The output circuit includes a two-winding differential relay 70 having windings 72 and 74 respectively associated with tubes 62 and 64. A single-pole double-throw switch associated with the armature of the relay 70 serves to control the rotation of the servo motor 52 to elevate or depress the table 24 in accordance with the corrective signal. The servo motor 52 may be either supplied from an A.C. or D.C. source. For purposes of illustration, a D.C. reversible motor 52 is shown in FIGURE 4 receiving its current from a D.C. source 78. In FIGURE 5 an alternative type of table drive is shown consisting of a two phase A.C. motor of a type well-known in the art.

In FIGURE 4 the entire heat detector 10 is oscillated to cyclicly vary the path of the incoming radiation with respect to the heat-sensitive cell 14. Another more satisfactory means of accomplishing such cyclical variation is shown in FIGURE 5. In this figure the reflector 12 is rigidly mounted on the table 24; however, an auxiliary mirror 80 in the path of radiation is oscillated by means of an oscillating cam 82. An arm 84 coupled to the auxiliary mirror 80 carries a moving contact 44. Relatively fixed contacts 46 and 48 are provided as in FIGURE 4. The structure shown in FIGURE 5 has the advantage that the vibrating components may be kept extremely small.

Figure 8:
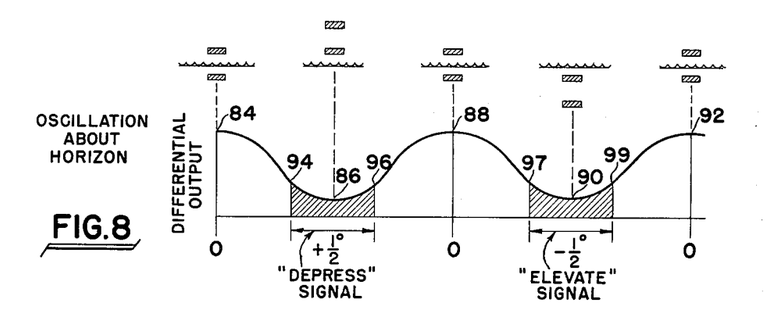
FIGURE 8 represents the differential output of the heat-sensitive cell as it is oscillated vertically about a point on the horizon.

Using either oscillating means the heat-sensitive elements 16 and 18 are caused vertically to scan over a small arc. In a practical application, the amplitude of scan from the midpoint should be approximately one-half degree. FIGURE 8 shows the differential output of the heat-sensitive cell with the detector pointed at the horizon. With a scanning elevation of zero degrees and with the detector directed at and "straddling" the horizon, the difference in radiant flux striking the heat-sensitive elements will be a maximum and the differential signal output of the cell will likewise be maximum. This is indicated at point 84 of FIGURE 8. As scanning takes place in an upward direction, the difference in the radiant flux received by element 16 as compared to element 18 will decrease, causing the differential signal to reach a minimum point as indicated at 86. Upon a return to the horizon, the signal will again increase to a maximum value incidated at 88 and upon being depressed below the horizon will reach another minimum value at the maximum angle of depression indicated at point 90. A return to the horizon will again produce a maximum signal as indicated at point 92. Near the upper limit of scan, contact 44 touches contact 48 applying excitation to tube 64 controlling operation of the motor tending to depress the table. The length of time that such contact takes place may be adjustable in order to produce optimum operation of the device. It may, for example, take place between point 94 and point 96 of the cycle. Near the lower limit of scanning movement contact 44 meets contact 46 applying excitation to tube 62 in the amplifier 54 which controls elevation of the table. The length of time such contact is maintained is indicated between point 97 and point 99 on the signal output curve.

Operation under the conditions in which the detector is oscillating about the horizon is as follows: With the scanning mechanism at its mid-point, the differential output of the heat-sensitive elements 16 and 18 appearing across the secondary 61 of the transformer 60 is a maximum. As the elevation of scan increases, the differential signal appearing across the secondary of transformer 60 decreases to a value indicated at 94 in FIGURE 8. Simultaneously the making of contacts 44 and 48 applies excitation to tube 64 which, if potentiometer 66 has been properly adjusted, will not be sufficient to cause the closure of contacts 75. Subsequent depression of the angle of scan results in the making of contacts 44 and 46 applying excitation to tube 62. However, since the differential signal is a minimum in the region of point 90 of FIGURE 8, the value of the signal applied to the grid of tube 62 is not sufficient to result in a flow of plate current sufficient to close contacts 76 provided that potentiometer 67 is properly adjusted. Thus it is seen that as long as oscillation of the path of received radiation takes place precisely about the horizon, the servo motor 52 will not operate to cause a change in the angle of the table 24.

Figure 9:
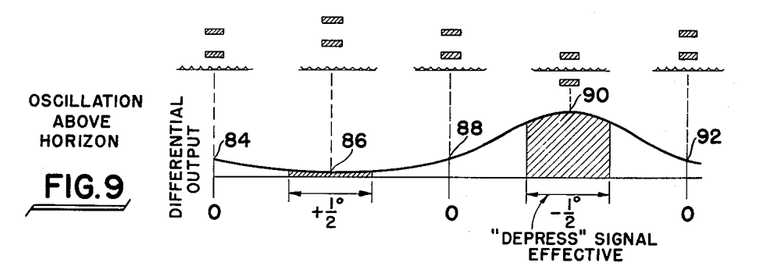
FIGURE 9 represents the differential output of the heat-sensitive cell with the detector oscillated about a point above the horizon.

Assume next that an angular tilt of the craft on which the equipment is mounted causes oscillation to take place above the horizon. This condition is illustrated by the curve of FIGURE 9. It will be seen that the only time at which a maximum differential signal is produced occurs at point 90 when the heat-sensitive elements are "straddling" the horizon. Simultaneously with this maximum signal, contact is made between contacts 44 and 46 applying maximum excitation to tube 62. Since this excitation is of a greater magnitude than that occurring at point 90 of FIGURE 8 previously discussed, the plate current flow through winding 72 of the relay 70 will be greater, causing the closing of contact 76. This causes operation of the servo 52 in a direction to lower or depress the angle of the table 24 to restore the condition existing during the period covered by FIGURE 8.

Figure 10:
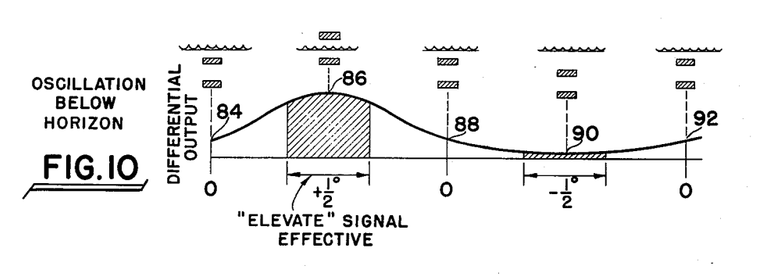
FIGURE 10 represents the differential output of the heat-sensitive cell with the heat detector oscillated about a point below the horizon.

The signal resulting from oscillation of the path of incoming radiation about a point below the horizon is shown in FIGURE 10. It will be seen that the only time during the scanning cycle that an appreciable signal is produced is at the point of maximum elevation corresponding to point 86 of FIGURE 10. As previously stated, contacts 44 and 48 are engaged at this point. Thus a comparatively large signal is applied to the input circuit of tube 64 causing a relatively large plate current to flow through winding 74 which results in closing of contacts 75. This produces operation of servo motor 52 in such a direction as to elevate the table 24 to restore a condition of equilibrium illustrated in FIGURE 8.

The operation of the vertical scanning mechanism shown in FIGURE 5 is completely analogous to that just discussed. It will be obvious to one skilled in the art that other vertical scanning systems and other scanner driving means may be used, provided that contacts 48 and 46 are energized near the point of maximum scanning elevation and depression respectively.

If desired, the servo motor 52 may be used to provide a vernier stabilizing action while a simple inaccurate type of gyroscopic stabilizer may be used to provide coarse stabilization. One type of mechanism which may be used to accomplish this is shown in FIGURE 6. Coarse stabilization is accomplished by means of a servo 98 energized in the conventional manner by any desired type of a gyroscopic stabilizer not shown. Servo 98 drives a floating circular rack or gear 100. Rigidly mounted to the rack 100 is the servo 52 which is controlled by the radiation-responsive apparatus discussed above. The worm 102 of the servo motor 52 drives a second circular rack or gear 104 which is coupled to the table 24 on which the radiation detector is mounted. This arrangement has the advantages that simple gyroscopic stabilizing equipment of a low order of accuracy may be used which will insure that the heat detector is constantly directed roughly in the region of the horizon. Thus the chance of the radiation detector being effected by extraneous sources of radiation is reduced.

The equipment to be stabilized may, if desired, be mounted directly on the table 24. Alternatively, however, such equipment may be mounted on additional tables arranged to be stabilized about an axis parallel to the axis of the table on which the detector is mounted. The angular position of such auxiliary tables may be made to coincide at all times with the angular position of the table 24 by means of selsyn or synchro position-duplicating devices of a type well-known to the art which do not require discussion.

Figure 11:
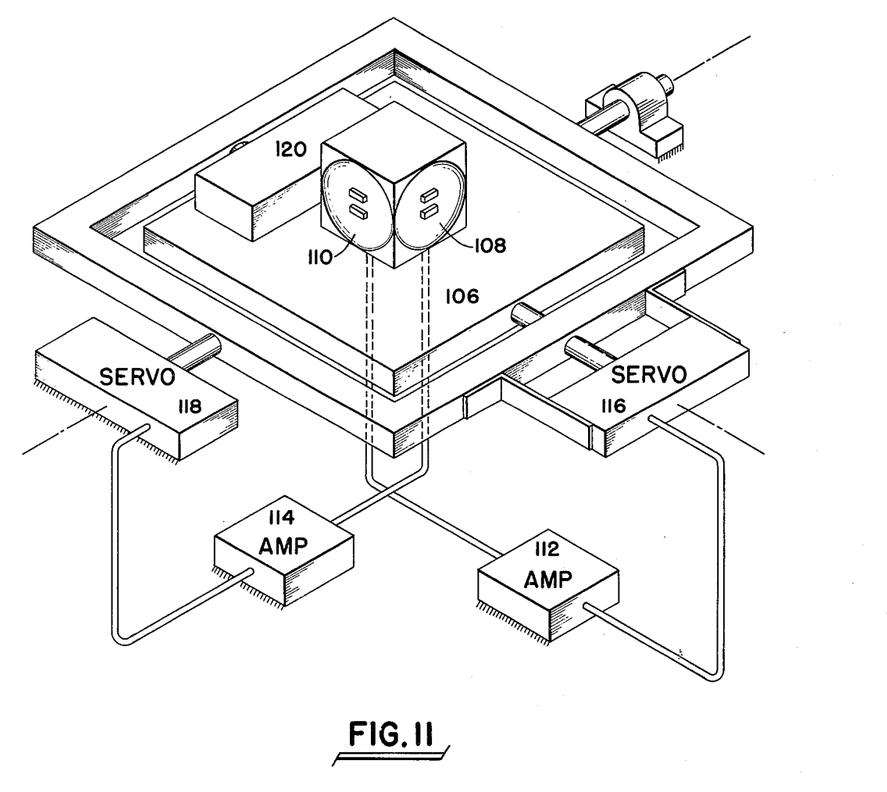
FIGURE 11 shows structure by means of which stabilization may be obtained about two mutually perpendicular horizontal axes.

FIGURE 11 shows a table 106 having mounted thereon heat detectors 108 and 110 in mutually perpendicular relation. The heat detector devices 108 and 110 include a vertical scanning mechanism of the type disclosed in either FIGURE 4 or FIGURE 5. Associated amplifiers 112 and 114 control servo devices 116 and 118 respectively which may, for example, be of the type shown in FIGURES 4, 5, or 6. The apparatus 120 to be stabilized may either be placed on table 106 as shown or on an auxiliary stabilized table operatively connected to table 106 by means of synchro devices.

Figure 12:
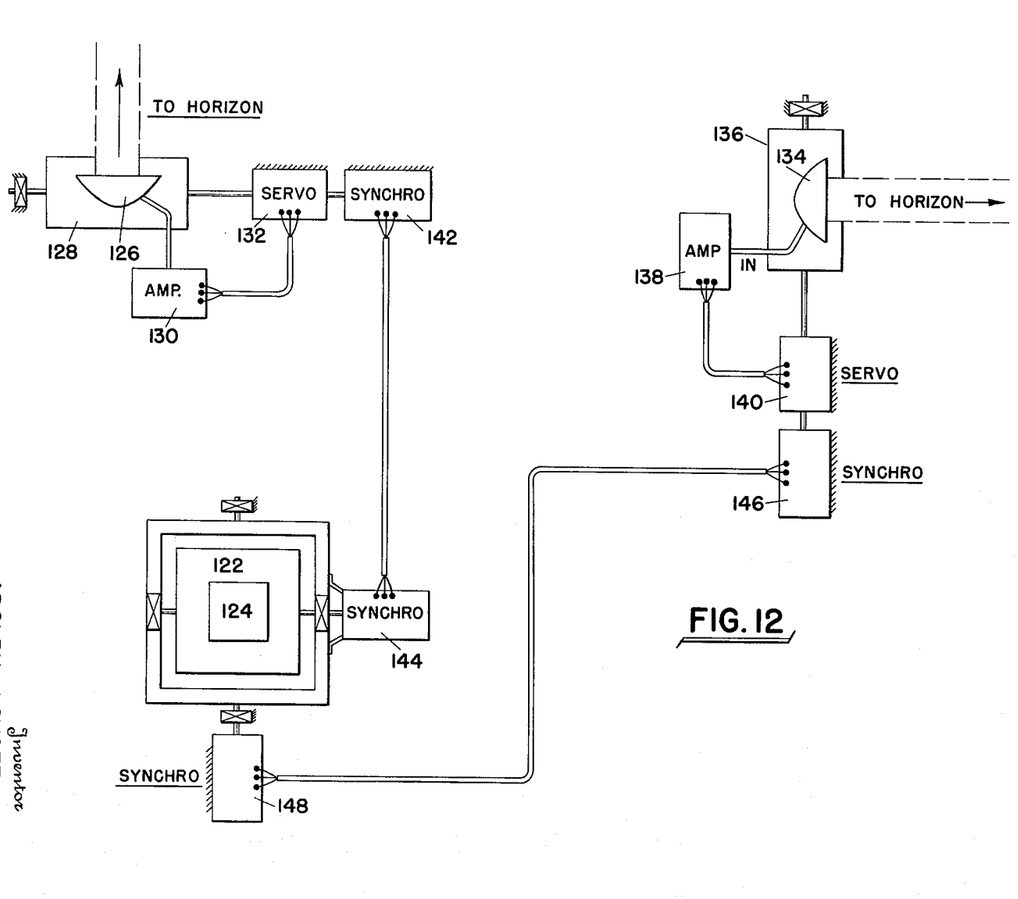
FIGURE 12 is a plan view showing a method of obtaining complete horizontal stabilization of a platform using two separately-mounted detectors.

FIGURE 12 is a plan view showing the use of separately-mounted detectors. A table 122 carries stabilized apparatus 124. Stabilization along a first axis is accomplished by the scanning heat-detector device 126 mounted on table 128 feeding into amplifier 130 and servo 132. Stabilization along a second axis at 90 degrees to the first is accomplished by heat-detector device 134 mounted on table 136 feeding into amplifier 138 thence to servo 140. Synchro devices 142 and 144 stabilize the table 122 about the first axis while synchro devices 146 and 148 stabilizes this table about the second axis.

It has been stated that a preferred amplitude of the angle of scanning is one-half degree. If desired, the scanning angle can be increased to one or even two degrees without appreciably affecting the accuracy of stabilization. The accuracy of stabilization is a function only of the average elevation of the detector and may be maintained with an error of a few minutes of arc.

The detector which I prefer and which is described above is of the differential type used in order to cancel out as much as possible of the extraneous background radiation. While the latter type of detector gives most satisfactory results, I do not wish to limit myself to the use of such a detector. If desired a single thermistor or thermopile placed at the focus of a parabolic mirror and scanned vertically across the horizon at a constant rate may be used to indicate the position of the horizon by utilizing the marked change in received radiation per degree of elevation existing at the horizon. The circuits of the amplifier and the construction of the scanning and servo equipment are for purposes of illustrations only. Many other modifications and variations included within the scope of my teaching will appear to one skilled in the art and I therefore wish it to be understood that my invention is not to be limited to the specific details shown and described above.

The invention described herein may be manufactured and used by or for the Government of the United States of America for governmental purposes without the payment of any royalties thereon or therefor.

What I claim is:

1. A device for stabilizing a table with respect to the horizon comprising a beam type heat detector device producing a characteristic uniform harmonic signal output when directed at a region of maximum vertical thermal gradient and uniformly oscillated vertically thereabout, a pivoted table to hold said detector, amplifier means to amplify the output of said heat detector device, power means operatively connected to said table angularly to position said table, electrical circuit energizing means for said power means, means connecting said energizing means in selective polarity to the power means during predetermined portions of said harmonic signal in response to deviations of the amplified signal from said uniform harmonic signal, said polarity of connection being determined by the sign of said deviations, whereby to angularly position the table and detector toward the region of said maximum signal gradient during said energization.

2. The subject matter as claimed in claim 1 including a device requiring horizontal stabilization, said device being operatively connected with said table.

3. A device for maintaining apparatus in fixed orientation with the horizon comprising a beam type heat detector, a horizontally pivoted mount for said heat detector, amplifier means to amplify the output signal of said heat detector, mount-positioning means controlled by said amplifier, means periodically to scan said heat detector vertically across the horizon with respect to said mount at a substantially uniform angular rate, means associated with said amplifier responsive to change in the output of said heat detector during predetermined portions of said scanning movement, said latter named means controlling the output of said amplifier whereby said positioning means is caused to maintain said heat detector at that average angular elevation at which the thermal gradient is a maximum, said maximum thermal gradient normally occurring at the horizon.

4. A method of stabilizing apparatus with respect to the horizon comprising directing generally at the horizon a beam type heat detector device producing a characteristic signal output when directed at a region of maximum vertical thermal gradient, amplifying said signal, utilizing deviations of said amplified signal from the characteristic signal to control detector-positioning means whereby said detector is repeatedly adjusted toward a position in which it is directed at the region of relatively large vertical thermal gradient existing at the horizon.

5. A method of horizontally stabilizing apparatus comprising directing at the horizon a heat detector of the type which produces a maximum signal output when directed at a region of maximum vertical thermal gradient, mechanically oscillating a component of said heat detector to produce a varying detector output signal, amplifying said detector output signal, utilizing portions of said amplified signal to control detector-positioning means wherby said detector is continually caused to assume an average vertical orientation in the direction of the region of relatively large vertical thermal gradient existing normally at the horizon.

6. A device for stabilizing apparatus with respect to the horizon comprising a beam type heat detector of the type producing a maximum signal output when directed at a region having a maximum vertical temperature gradient, a heat-sensitive element in said heat detector, a mount to hold said detector, said mount allowing said detector to move in a vertical arc across the horizon, oscillatory means coupled to said detector, said oscillatory means being effective to alter the path of incoming radiation with respect to said heat-sensitive element to produce a periodically-varying detector output signal, amplifier means to amplify said varying output signal, power adjusting means controlled by said amplifier means, said power adjusting means arranged to maintain said heat detector oriented in a direction of relatively large vertical thermal gradient existing normally at the horizon.

7. The subject matter as claimed in claim 6 including a table for apparatus to be stabilized, said table being mechanically connected with said mount to maintain apparatus mounted thereon in a fixed position with respect to the horizon.

8. The subject matter as claimed in claim 6 including auxiliary table adjustable with respect to the horizon, power table-adjusting means, said power adjusting means being controlled by said amplifier to maintain said table stabilized with respect to the horizon.

9. A device for stabilizing apparatus with respect to the horizon comprising a pair of beam type heat detectors of the type producing a maximum signal output when directed at a region having a maximum vertical temperature gradient, heat-sensitive elements in each of said detectors, separate mounts for said detectors, said mounts being horizontally pivoted at right angles to each other to allow said detectors to move in substantially vertical arcs at right angles to each other across spaced points on the horizon, oscillatory means associated with each of said detectors, said oscillatory means being effective to alter periodically the path of incoming radiation with respect to each of said heat-sensitive elements to produce periodically varying detector output signals, separate amplifier means acted upon by each of said output signals, mount-adjusting operators for each of said mounts respectively controlled by said amplifier means and effective to maintain said detectors constantly pointed at the angular elevation of relatively large thermal gradient normally existing at the horizon, a table adapted to hold apparatus requiring stabilization, gimbal mounting means for said table, said table-adjusting means including table-adjusting operators operatively associated with the respective mount-adjusting operators and effective to rotate said table about axes respectively parallel to the axes of rotation of the associated detector mount.

10. A device to stabilize apparatus with respect to the horizon comprising a plurality of beam type heat detectors of the type producing a characteristic output signal when directed at the horizon, a table for mounting said heat detectors, said heat detectors being mounted on said table in such a manner that the axes of said heat detectors intersect to form a plane, amplifier means for each of said heat detectors, mounting means for said table allowing said table to be rotated about horizontal axes respectively perpendicular to the axes of said heat detectors, power adjusting means associated respectively with each of said amplifier means, said power adjusting means being effective to rotate said table about said table axes whereby the radiant heat reaching said detectors with said detectors directed at the horizon is effective to operate the table adjusting means to maintain each of said detectors in a position in which it is directed at the horizon.

11. The subject matter as claimed in claim 10, including an apparatus mount requiring horizontal stabilization along all horizontal axes, said apparatus mount being operatively connected to said table to effect stabilization of said table.

12. A method of stabilizing apparatus with respect to the horizon comprising directing at the horizon a beam type heat-detector device producing a characteristic signal output when directed at a region of maximum vertical thermal gradient, scanning said heat detector through a small vertical arc, amplifying said signal, and utilizing maximum portions of said amplified signal exceeding a predetermined value when the scanning means is near the limits of scanning movement to cause energization of detector-positioning means thereby to cause movement of said detector-positioning means in such a direction as to restore the mean elevation of said heat-detector device to said region of relatively large vertical thermal gradient existing at the horizon.

13. A device for maintaining apparatus in fixed orientation with respect to the horizon comprising a beam type heat detector, a horizontally-pivoted mount for said detector, an amplifier to amplify the output signal of said heat detector, means including a pivoted lever gear connected to said detector periodically to scan said heat detector vertically across the horizon with respect to said mount, switch means actuated by said lever constructed and arranged to select portions of the output from said amplifier at opposite extremes of motion of the lever, corresponding to opposite polarity of output switch armature means mounted on the arm of said lever adapted to close the output circuit of said amplifier, electro-mechanical mount-elevating means controlled by said switch armature means to control operation of said electromechanical means in direction according to said polarity of output selected, and means limiting operation of the electro-mechanical mount-elevating means to said selected signals of greater than predetermined magnitude.

14. A method of horizontally stabilizing apparatus comprising directing at the horizon a heat detector of the type which produces a maximum signal output when directed at a region of maximum vertical thermal gradient, mechanically oscillating a component of said heat detector to produce a varying detector output signal, amplifying said detector output signal, selecting positive and negative portions of said amplified signal corresponding to the limits of said oscillation, applying said portions of amplified signal selectively to said detector-positioning means to cause movement of said detector-positioning means in the direction of a region of relatively large vertical thermal gradient existing normally at the horizon.

15. A device for stabilizing apparatus with respect to the horizon comprising a beam type heat detector of the type producing a maximum signal output when directed at a region having a maximum vertical temperature gradient, heat-sensitive elements in said detector, a mount to hold said detector, said mount allowing said detector to move in a vertical arc across the horizon, oscillatory means including a pivoted lever coupled to said detector, said oscillatory means being effective by means of the pivoted lever vertically to alter the incoming radiation with respect to said heat-sensitive elements to produce a periodically-varying detector output signal, amplifier means to amplify said varying output signal, switch means mounted on the arm of said lever and actuated thereby at the extremes of motion thereof for energizing each of a pair of circuits, electro-mechanical adjusting means coupled to said mount and actuated selectively in opposite directions by said circuits in response to predetermined energization thereof, for repeatedly adjusting said mount in vertical orientation.

16. A device for maintaining apparatus in fixed orientation with respect to the horizon comprising a beam type heat detector responsive to thermal gradient, a horizontally-pivoted mount for said detector, means including a pivoted lever coupled to said detector periodically to scan the path of incoming radiation across the horizon through a small vertical angle, switch armature means mounted on the arm of said lever, an amplifier electrically connected to said detector, mount-elevating means controlled by said amplifier, said switch means comprising a first set of contacts and a second set of contacts electrically connected in the output circuit of said amplifier, said first set of contacts making contact when said pivoted lever is near the upper limit of scan, said second set of contacts making contact when said pivoted lever is near the lower limit of scan, said first set of contacts effective to cause said amplifier to depress said mount, said second set of contacts effective to cause said amplifier to elevate said mount, whereby said heat detector is caused to be maintained at that average angular elevation at which the thermal gradient is a maximum, said maximum thermal gradient normally occurring at the horizon.

17. The stabilizing device as claimed in claim 16, including adjustment means in said amplifier whereby said amplifier is ineffective to cause operation of said mount-elevating means except in response to input signals exceeding a predetermined magnitude 18. A device for stabilizing apparatus with respect to the horizon comprising a horizontally pivoted beam type heat detector having a heat sensitive unit comprising opposedly connected elements producing a characteristic signal output when directed at a region containing adjacent areas in vertically spaced relation of unlike thermal radiation characteristics, a horizontally pivoted mount for said detector, mechanical means including a pivoted lever coupled to said detector for oscillating the latter about said horizontal pivot axis, amplifier means to amplify the output of said heat-sensitive unit, electrically driven means adjusting said mount about the horizontal pivots, and electrical switching means selectively responsive to opposite deviations of the amplified signal from the form of said characteristic signal for oppositely actuating said electrically driven means.

19. The subject matter as claimed in claim 18 including a substantially horizontally pivoted table for auxiliary apparatus to be horizontally stabilized, table-positioning means controlled by said amplifier to maintain said auxiliary apparatus in fixed orientation with respect to the horizon.

20. The subject matter as claimed in claim 18 including a substantially horizontally pivoted table for auxiliary apparatus to be horizontally stabilized, table positioning means controlled by the position of said mount to maintain said apparatus in fixed orientation with respect to the horizon.

References Cited in the file of this patent

UNITED STATES PATENTS

| | | |
|---|---|---|
| 2,334,085 | Graves et al. | Nov. 9, 1943 |
| 2,369,622 | Toulon | Feb. 13, 1945 |
| 2,392,873 | Zahl | Jan. 15, 1946 |